(12) United States Patent
Kotas et al.

(10) Patent No.: US 11,606,339 B1
(45) Date of Patent: Mar. 14, 2023

(54) PRIVACY PROTECTING TRANSACTION ENGINE FOR A CLOUD PROVIDER NETWORK

(71) Applicant: Amazon Technologies, Inc., Seattle, WA (US)

(72) Inventors: Paul A. Kotas, Seattle, WA (US); Keerat Singh Sharma, Longmont, CO (US); Matthew H. Battles, Deer Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 17/185,796

(22) Filed: Feb. 25, 2021

(51) Int. Cl.
*H04L 9/40* (2022.01)
(52) U.S. Cl.
CPC .............................. *H04L 63/0414* (2013.01)
(58) Field of Classification Search
CPC .................................................. H04L 63/0414
See application file for complete search history.

(56) References Cited

U.S. PATENT DOCUMENTS

| | | | | |
|---|---|---|---|---|
| 7,941,859 | B2 * | 5/2011 | Camenisch | G06F 21/6245 713/193 |
| 11,409,909 | B1 * | 8/2022 | Alderton | G06F 21/629 |
| 2007/0239606 | A1 * | 10/2007 | Eisen | G06Q 20/3674 705/51 |
| 2010/0010944 | A1 * | 1/2010 | Cheng | G06Q 10/06 709/224 |
| 2012/0227094 | A1 * | 9/2012 | Begen | H04L 63/0815 726/4 |
| 2012/0266250 | A1 * | 10/2012 | Uhl | G06F 21/6254 726/26 |
| 2013/0219178 | A1 * | 8/2013 | Xiques | H04L 65/70 713/168 |
| 2014/0032306 | A1 * | 1/2014 | Sukornyk | G06Q 30/0269 705/14.43 |
| 2015/0128162 | A1 * | 5/2015 | Ionescu | H04N 21/2668 725/14 |
| 2017/0116693 | A1 * | 4/2017 | Rae | G06Q 50/184 |
| 2017/0364910 | A1 * | 12/2017 | Malhotra | G06Q 20/3221 |
| 2020/0412767 | A1 * | 12/2020 | Crabtree | H04L 63/1441 |
| 2021/0334797 | A1 * | 10/2021 | Tripathy | G06Q 20/027 |
| 2022/0182363 | A1 * | 6/2022 | Bharti | H04L 63/0421 |

\* cited by examiner

*Primary Examiner* — William S Powers
(74) *Attorney, Agent, or Firm* — Nicholson De Vos Webster & Elliott LLP

(57) ABSTRACT

A privacy protecting transaction engine for a cloud provider network is described. According to some embodiments, a computer-implemented method includes receiving a request from a customer of a cloud provider network to create a customer cloud in the cloud provider network, generating the customer cloud in the cloud provider network, receiving a first request at the cloud provider network for the customer cloud that includes private information of an end customer of the customer of the cloud provider network, removing the private information from the first request by a privacy protecting transaction engine of the cloud provider network to generate a second request, and sending the second request to the customer cloud for servicing.

20 Claims, 14 Drawing Sheets

COMPUTING SERVICE(S)
108

DATA PROCESSING SERVICE
108A

DATA ANALYSIS SERVICE
108B

CONTENT DELIVERY SERVICE
108C

*FIG. 6*

PRIVACY PROTECTING TRANSACTION ENGINE FOR A CLOUD PROVIDER NETWORK

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the following drawings.

FIG. 6 is a diagram illustrating example computing services according to some embodiments.

DETAILED DESCRIPTION

Figure 1:
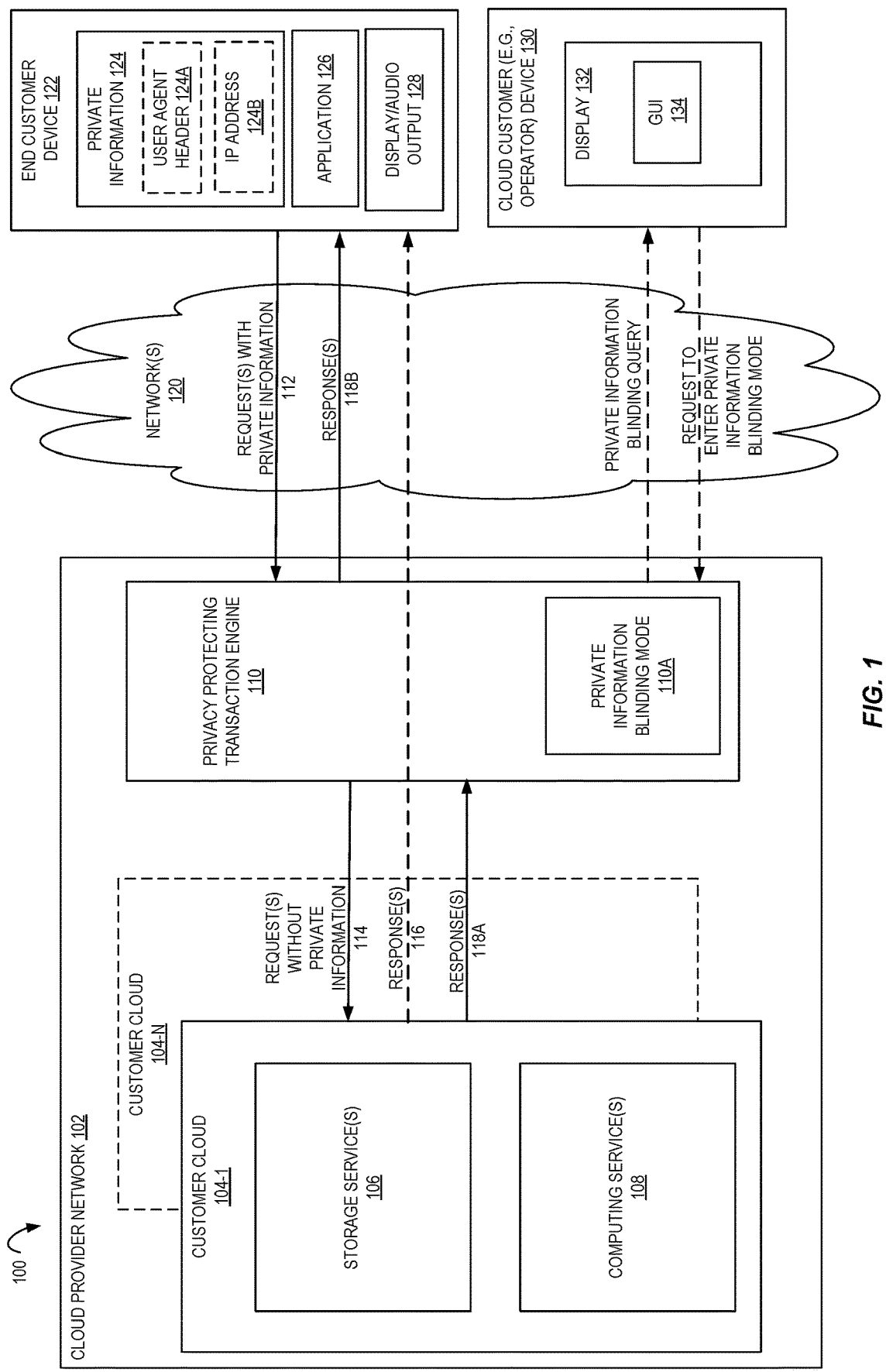
FIG. 1 is a diagram illustrating an environment including a cloud provider network having a privacy protecting transaction engine according to some embodiments.

The present disclosure relates to methods, apparatus, systems, and non-transitory computer-readable storage media for protecting the privacy of transactions in a cloud provider network. Certain embodiments herein are directed to a privacy protecting transaction engine (e.g., service) that auditably blinds certain privacy sensitive (or other commercially sensitive) information at the network border of a cloud provider network, for example, enabling a customer of the cloud provider network to make a strong statement such as: we never use private information (for example, an Internet Protocol (IP) address and/or user agent header, e.g., of an end customer of the cloud customer) for targeting and/or our cloud (e.g., servers thereof) never receives this private information. Certain embodiments herein include a privacy protecting transaction engine that on receipt of data (e.g., a request) from outside of the cloud provider network, scans that data for private information and, in response to detecting private information, performs one or more of: (i) deleting the private information within the cloud provider network (e.g., and maintaining a record of the deleted private information within the cloud provider network), (ii) generating a secret (e.g., unique) identification key for that private information and blinding a customer cloud of that information by utilizing the key instead of the private information (e.g., a key that is mapped to that private information within a privacy safe cloud of the cloud provider network maintained on behalf of the customer but inaccessible by the cloud customer), (iii) timing out the use of the key, or (iv) passing the private information through to the customer cloud without taking any action on the private information. In one embodiment, there is a transformation of the data to be blinded, for example, a (e.g., per-day, per-week, etc.) hash of the private information. The private information may be an IP address and/or user agent header that is mapped (e.g., hashed) to a key to allow the customer cloud to perform certain actions for a particular end customer of the cloud customer without utilizing the private information, for example, to enable frequency capping (e.g., per day).

A customer may provide media (e.g., an advertising image, video, and/or audio) to their end customer(s) via a customer cloud. It may be desirable to track information or activity for an end customer without the customer cloud utilizing (or even receiving) private information (e.g., the IP address and/or user agent header) of that end customer. Embodiments herein utilize a privacy protecting transaction engine (e.g., service) that blinds the private information (e.g., IP address and/or user agent header) and has exclusive access to the private information within the cloud provider network (e.g., and exclusive access to a privacy safe cloud). Embodiments herein utilize a privacy protecting transaction engine (e.g., service) that blinds the private information (e.g., IP address and/or user agent header) by utilizing a secret (e.g., unique) value instead of the private information, for example, to track a number of times a media file has been provided to (e.g., displayed by) a device of the end customer via the secret value (e.g., to prevent the device of the end customer from displaying the media file to the end customer when the number of times exceeds a threshold number of times).

Certain embodiments herein are directed to a privacy protecting transaction engine (e.g., service) that enables a forked workflow, for example, where private information (e.g., IP address and/or user agent header) could be shared with a fraud detection services, e.g., with responses joined at the privacy protecting transaction engine (e.g., service) and (e.g., transparent and/or auditable) logic executed in the privacy protecting transaction engine (e.g., service). For example, with this being a clean transaction engine in contrast to a data clean room.

FIG. 1 is a diagram illustrating an environment 100 including a cloud provider network 102 having a privacy protecting transaction engine 110 according to some embodiments. Cloud provider network 102 may include one or more customer clouds, e.g., customer cloud 104-1 for a first customer (e.g., tenant) and customer cloud 104-N (where N is a positive integer greater than one) for one or more additional customers (e.g., tenants). One or more storage services, computing services, content delivery services (e.g., content delivery service 108C in FIG. 6), or other services may be implemented within cloud (e.g., multiple tenant) provider network 102. Each customer cloud may include one or more storage services (e.g., storage service(s) 106 for customer cloud 104-1) and/or one or more computing services (e.g., computing service(s) 108 for customer cloud 104-1). Example storage services are discussed below in reference to FIG. 5 and example computing services are discussed below in reference to FIG. 6. Each of the one or more computing services and one or more storage services may be implemented via software, hardware, or a combination of both, and may be implemented in a distributed manner using multiple different computing devices.

Provider network 102 ("cloud" provider network) provides users (e.g., cloud customer via device 130) with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a computing service 108), a storage service 106 that can store data objects, etc. The users (or "customers") of provider network 102 may utilize one or more user accounts that are associated with a customer account, though these terms may be used somewhat interchangeably depending upon the context of use. Users may interact with a provider network 102 across one or more intermediate networks 120 (e.g., the internet) via one or more interface(s), such as through use of application programming interface (API) calls, via a console implemented as a website or application, etc. The interface(s) may be part of, or serve as a front-end to, a control plane of the provider network 102 that includes "backend" services supporting and enabling the services that may be more directly offered to customers.

For example, a cloud provider network 102 may refer to a large pool of accessible virtualized computing resources (such as compute, storage, and networking resources, applications, and services), e.g., a cloud for each customer. A customer cloud can provide convenient, on-demand network access to a shared pool of configurable computing resources that can be programmatically provisioned and released in response to customer requests (e.g., commands) These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 102 may rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 102 by an on-demand code execution service (which may be one of compute service(s)) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 1040B) that can be executed on demand, without requiring the user to maintain dedicated infrastructure to execute the serverless function. Instead, the serverless functions can be executed on demand using resources maintained by the provider network 102. In some embodiments, these resources may be maintained in a "ready" state (e.g., having a pre-initialized runtime environment configured to execute the serverless functions), allowing the serverless functions to be executed in near real-time.

Certain embodiments herein include a privacy protecting transaction engine 110 (e.g., service) that auditably blinds certain privacy sensitive (or other commercially sensitive) information at the network border of cloud provider network 102. In one embodiment, the privacy protecting transaction engine 110 receives data (e.g., a request) from outside of the cloud provider network 102, scans that data for private information and, in response to detecting private information, performs one or more of: (i) deleting the private information within the cloud provider network (e.g., and maintaining a record of the deleted private information within the cloud provider network), (ii) generating a secret (e.g., unique) identification key for that private information and blinding a customer cloud of that information by utilizing the key instead of the private information (e.g., a key that is mapped to that private information within a privacy safe cloud of the cloud provider network on behalf of the customer), (iii) timing out the use of the key, or (iv) passing the private information through to the customer cloud without taking any action on the private information. In one embodiment, cloud customer (e.g., operator) device 130 includes a display 132 having a graphical user interface (GUI) 134, e.g., to display a query for privacy protecting transaction engine 110 to enter (or not) private information blinding mode 110A.

Depicted end customer (e.g., viewer) device 122 (e.g., where the viewer is a customer of cloud customer (e.g., operator of device 130)) includes private information 124, e.g., the user agent header 124A (e.g., value that identifies an (software) application, its version number, programming language, or other attributes) and/or IP address 124B. End customer device 122 may include one or more applications 126, e.g., a media player, web browser, etc. A media player may cause a display of video and/or a play of audio output 128, e.g., of a media file provided (or identified) by a customer cloud.

In certain embodiments, privacy protecting transaction engine 110 (e.g., service) blinds the private information 124 (e.g., received with or corresponding to request 112), e.g., such that no customer cloud receives that information. In one embodiment, privacy protecting transaction engine 110 receives a request 112 (e.g., command) for customer cloud 104-1 from end customer device 122 that includes private information 124 and privacy protecting transaction engine 110 then removes the private information from the request to generate request 114 (e.g., command) without the private information and passes that request 114 to the customer cloud 104-1 for servicing, e.g., servicing by storage service(s) 106 and/or computing service(s) 108. Customer cloud 104-1 may then send a resulting response, e.g., response 118A to privacy protecting transaction engine 110 and/or response 116 directly to end customer device 122 (e.g., without sending that response to privacy protecting transaction engine 110). In certain embodiments, privacy protecting transaction engine 110 sends response 118B to end customer device 122 in response to receiving response 118A. Although the request with private information 112 is depicted as being sent (e.g., directly) from end customer device 122, it should be understood that private information about end customer(s) may be sent by a cloud customer (e.g., via device 130), for example, as a batch of aggregated data to be processed by privacy protecting transaction engine 110. It should be understood that more than one end customer (e.g., and corresponding device) may utilize a single customer cloud.

Figure 2:
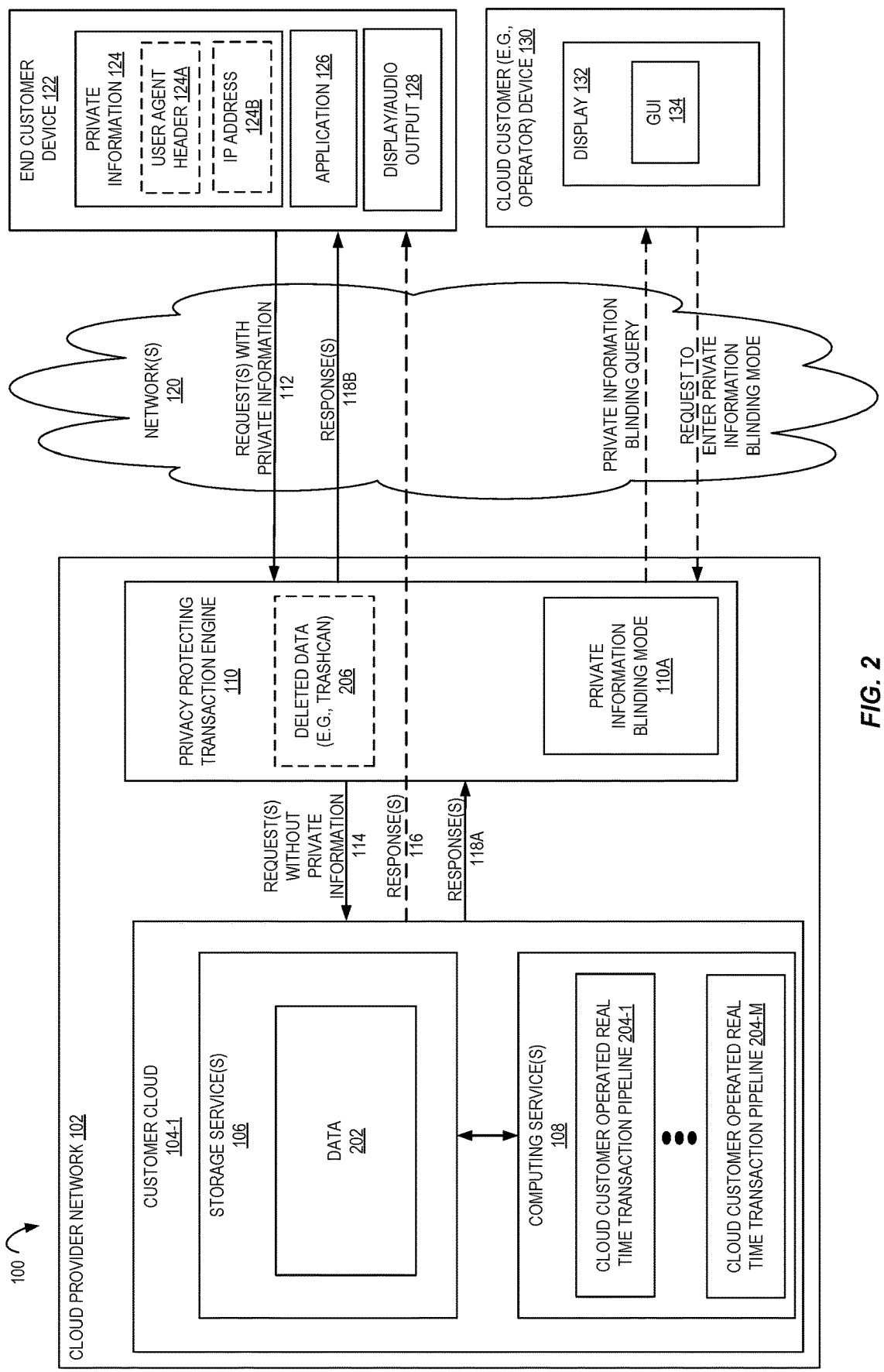
FIG. 2 is a diagram illustrating an environment including a cloud provider network having a privacy protecting transaction engine and a customer cloud including one or more storage services and one or more computing services according to some embodiments.

FIG. 2 is a diagram illustrating an environment 100 including a cloud provider network 102 having a privacy protecting transaction engine 110 and a customer cloud 104-1 including one or more storage services 106 and one or more computing services 108 according to some embodiments. Storage service(s) 106 may store data 202, e.g., data for cloud customer and/or that cloud customer's end customer(s). Computing service(s) 108 may include one or more cloud customer operated real time transaction pipelines, e.g., pipeline 204-1 to pipeline 204-M, where M is any positive integer greater than one. Optionally, privacy protecting transaction engine 110 includes deleted data 206 (e.g., trashcan) to (e.g., temporarily) store deleted private information from request 112. In certain embodiments, deleted data 206 includes a record of the deleted private information, e.g., as proof that private information was never sent to customer cloud 104-1 and/or that the private information was deleted.

Figure 3:
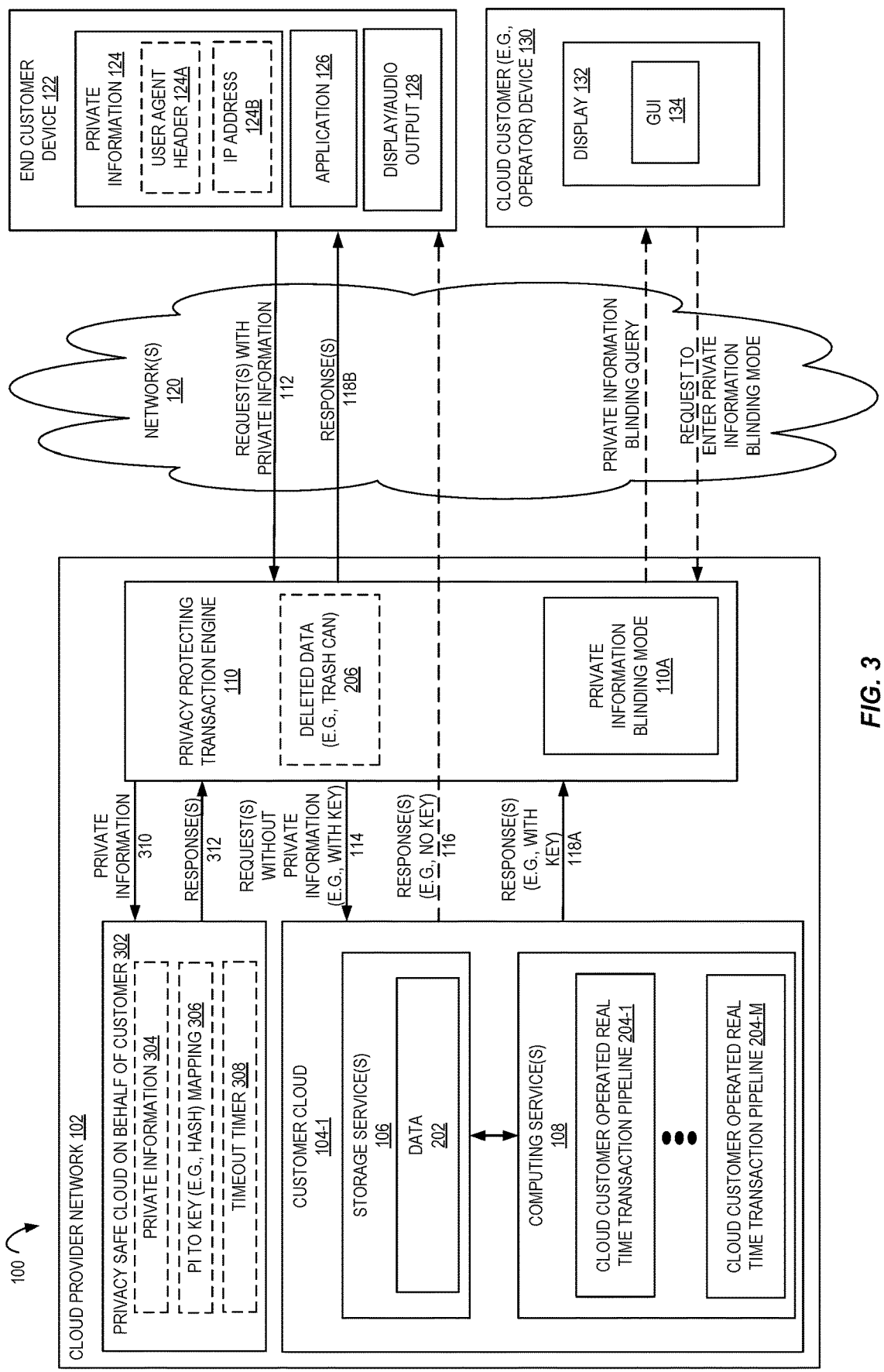
FIG. 3 is a diagram illustrating an environment including a cloud provider network having a privacy protecting transaction engine and a privacy safe cloud on behalf of a customer according to some embodiments.

FIG. 3 is a diagram illustrating an environment 100 including a cloud provider network 102 having a privacy protecting transaction engine 110 and a privacy safe cloud 302 on behalf of a customer according to some embodiments. In certain embodiments, (e.g., any) customer cloud does not have access to privacy safe cloud 302 that is managed on behalf of cloud customer by cloud provider network 102. In one embodiment, private information 304 detected by privacy protecting transaction engine 110 is (e.g., only) sent at 310 to privacy safe cloud 302.

In certain embodiments, privacy safe cloud 302 is used by privacy protecting transaction engine 110 to store private information 304 separately from any customer cloud. In certain embodiments, privacy protecting transaction engine 110 generates a secret identification key (e.g., by hashing the private information to a hashed value that does not include the private information) for detected private information, e.g., and blinds the customer cloud 104-1 of that information by utilizing the key instead of the private information. In certain embodiments, the privacy safe cloud 302 stores the mapping 306 of the key to that private information. The privacy protecting transaction engine 110 (e.g., and only it) can use the mapping 306 to determine (e.g., recover) corresponding private information from the key (e.g., the key provided back from customer cloud 104-1 with response 118A). In certain embodiments, the privacy safe cloud 302 stores a timeout timer 308, e.g., to time out the use of the key (or the privacy safe cloud 302) after a threshold amount of time has passed, e.g., hours, days, etc. In one embodiment, an identification key is unique for a single user, e.g., unique for their private information. In one embodiment, multiple identification keys map to a single user (e.g., to their private information), for example, a different key may be used after the elapse of a certain period of time (e.g., on a daily, weekly, monthly, etc. basis) for a same user. In certain embodiments, the mapping of a secret key is secret from customers, e.g., the mapping is secret from any customer cloud(s).

In one embodiment, privacy protecting transaction engine 110 receives a request 112 (e.g., command) for customer cloud 104-1 from end customer device 122 that includes private information 124 and privacy protecting transaction engine 110 then generates a secret identification key for that private information (e.g., and stores the mapping 306), removes the private information from the request and adds the key to generate request 114 (e.g., command) without the private information and passes that request 114 to the customer cloud 104-1 for servicing, e.g., by storage service(s) 106 and/or computing service(s) 108. Customer cloud 104-1 may then send a resulting response, e.g., response 118A (e.g., with key) to privacy protecting transaction engine 110 and/or response 116 directly to end customer device 122 (e.g., without the key and/or without sending that response to privacy protecting transaction engine 110). In certain embodiments, privacy protecting transaction engine 110 sends response 118B to end customer device 122 in response to receiving response 118A with key, e.g., by determining the private information from the key from mapping 306 in response 312.

Request 112 may be a request for an advertisement, e.g., from application 126. For example, cloud customer (e.g., the sole tenant of customer cloud 104-1 and/or operator of device 130) may implement an advertising exchange (ad-exchange) service on customer cloud 104-1, e.g., such that the ad-exchange sells the opportunity to deliver an advertisement to end user (e.g., their device 122). In certain embodiments, the private information (e.g., IP address and/or user agent header) of the end customer (e.g., device 122) is removed from request 112, and a key is generated for that private information and passed together with the request that had the private information removed as request 114 to the customer cloud 104-1 for servicing, e.g., by storage service(s) 106 and/or computing service(s) 108. Customer cloud 104-1 may then send a resulting response, e.g., response 118A (e.g., with key) to privacy protecting transaction engine 110 and/or response 116 directly to end customer device 122 (e.g., without the key and/or without sending that response to privacy protecting transaction engine 110). For example, to utilize the key to track a number of times a (e.g., advertising) media file has been provided to (e.g., displayed by) a device of the end customer identified by the key, e.g., to prevent the device of the end customer from displaying the media file to the end customer when the number of times exceeds a threshold number of times. In certain embodiments, the use of a key overcomes the issues of totally anonymizing data from an end customer, e.g., where the customer cloud cannot identify a particular end customer in such cases and thus cannot track their experience (e.g., cannot track which particular media file(s) have been presented to that end customer).

In certain embodiments, the response to an end customer device is a pointer to a media file to be displayed/played. In certain embodiments, the computing service 108 queries a data set stored in a table to find relevant advertisement file(s) (e.g., advertising image, video, and/or audio) based on (e.g., non-private) information of the end customer. In certain embodiments, advertisement file(s) (e.g., advertising image, video, and/or audio) are stored in storage service 106.

Figure 4:
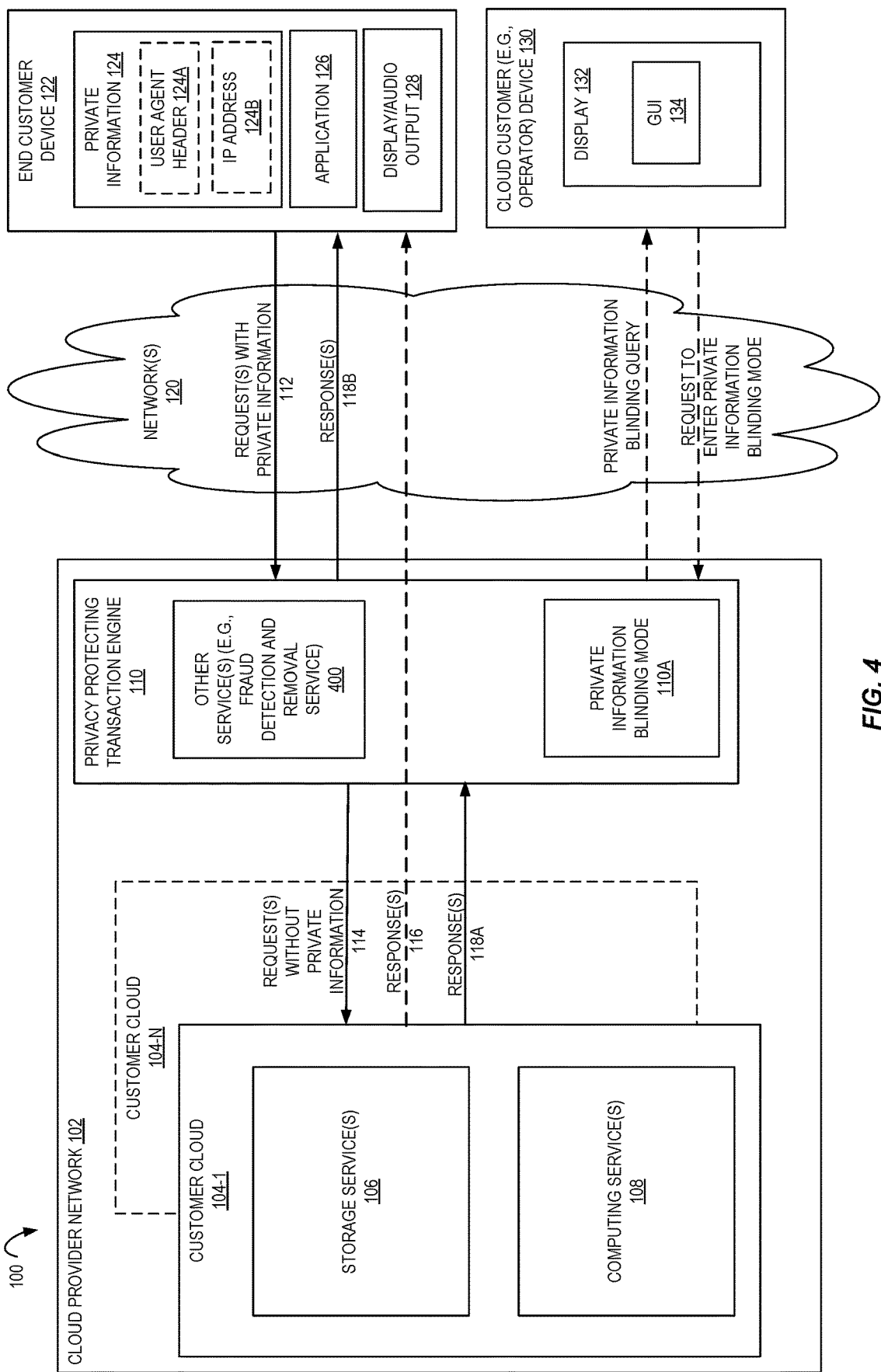
FIG. 4 is a diagram illustrating an environment including a cloud provider network having a privacy protecting transaction engine and a fraud detection (e.g., and removal) service according to some embodiments.

FIG. 4 is a diagram illustrating an environment 100 including a cloud provider network 102 having a privacy protecting transaction engine 110 including other service(s) 400 according to some embodiments. In certain embodiments, other service 400 has access to the private information, e.g., and can take action on it. In one embodiment, the other service is a third-party vendor service.

In certain embodiments, in addition to removing private information for the request that is to be sent to a customer cloud, the private information (e.g., IP address and/or user agent header) is also shared (e.g., after being encrypted) with other service(s) 400, e.g., operated on by service(s) 400 external to the privacy protecting transaction engine 110 and/or service(s) 400 internal to the privacy protecting transaction engine 110.

One example of other service(s) 400 is a (e.g., third-party) fraud detection (e.g., and removal) service 400, e.g., with responses joined at the privacy protecting transaction engine 110 (e.g., service) and (e.g., transparent and/or auditable) logic executed in the privacy protecting transaction engine (e.g., service). In certain embodiments, fraud detection (e.g., and removal) service is to utilize private information (e.g., IP address and/or user agent header) of the end customer (e.g., device 122) to determine if a request (e.g., command) is fraudulent, e.g., and take remedial action. In one embodiment, fraud detection (e.g., and removal) service applies rules and other security protections before allowing a request (e.g., command) to enter within a customer cloud (e.g., or within cloud provider network), e.g., to help minimize the effects of a distributed denial of service (DDoS) attack. In certain embodiments, fraud detection (e.g., and removal) service is a web application firewall that monitors (e.g., Hypertext Transfer Protocol (HTTP)) requests that are sent to a cloud provider network (e.g., to a particular customer cloud thereof), for example, to allow requests to proceed or block (e.g., cancel) them (e.g., and sends an HTTP 403 status code (Forbidden) or a custom error page when a request is blocked).

Another example of other service(s) is a network optimization service.

Yet another example of other service(s) 400 is a pharmaceutical service. For example, where a request 112 from end customer device 122 is for the purchase of a pharmaceutical product, the request 112 goes to privacy protecting transaction engine 110 which removes any private information (for example, the information indicating the action taken by the customer (e.g., the purchase of the pharmaceutical product)) but passes the cost of the pharmaceutical product to customer cloud 104-1 for it to perform a billing operation (e.g., and the pharmaceutical service performs the fulfillment of the order).

Another example of other service(s) 400 is a biometrics service (e.g., voice activated service). For example, where the request 112 goes to privacy protecting transaction engine 110 which causes the other service to convert the audio version of the voice file in request 112 from end customer device 122 to a transcript (e.g., text file) version to strip out the voice identifying private information (e.g., and customer metadata), and sends the transcript version to the customer cloud 104-1 for servicing.

Figure 5:
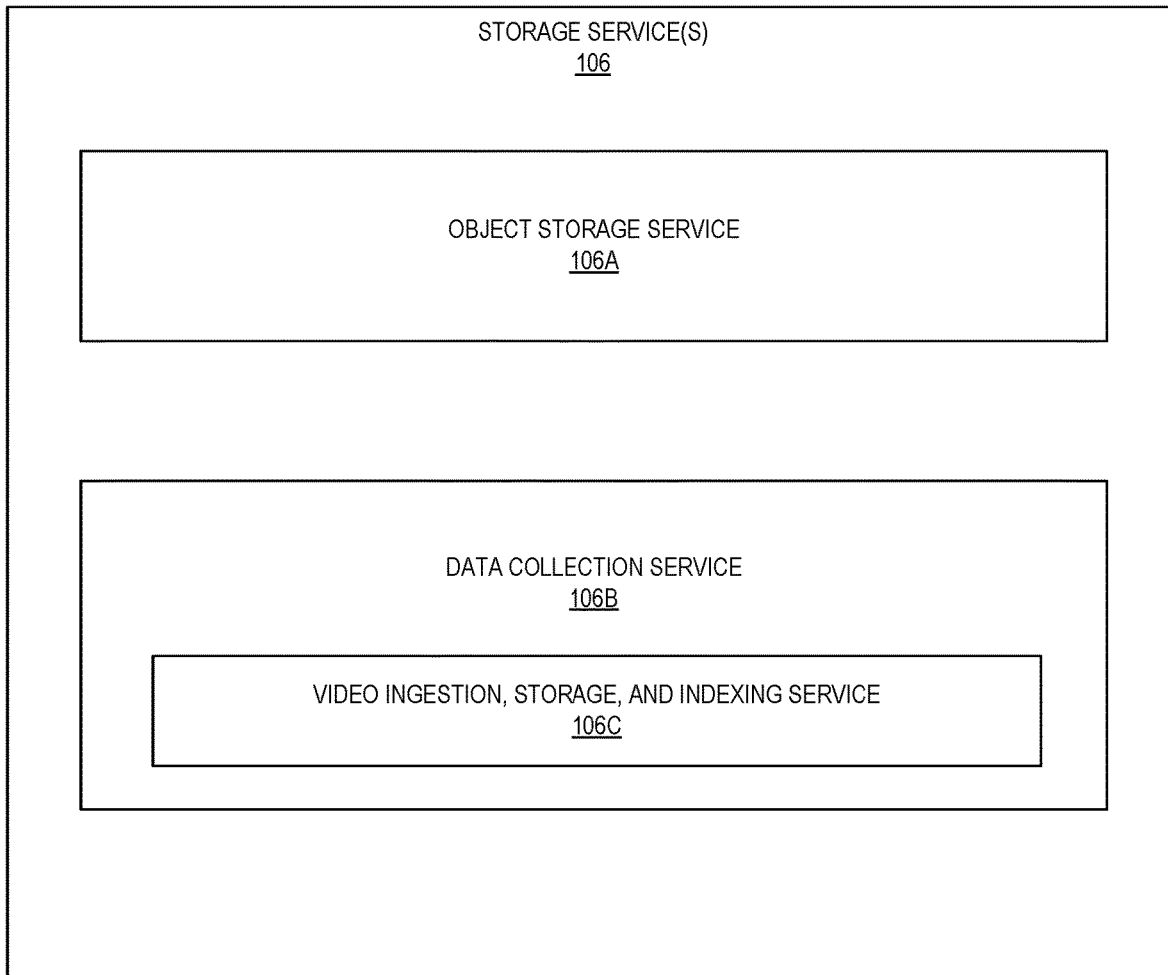
FIG. 5 is a diagram illustrating example storage services according to some embodiments.

FIG. 5 is a diagram illustrating example storage services 106 according to some embodiments. Storage services 106 may include an (e.g., scalable) object storage service 106A to store one or more objects and/or a (e.g., real-time streaming) data collection service 106B to collect one or more items of data (e.g., including a video ingestion, storage, and indexing services 106C).

FIG. 6 is a diagram illustrating example computing services 108 according to some embodiments. Computing services 108 may include data processing service 108A (e.g., to perform web indexing, data mining, log file analysis, machine learning, financial analysis, scientific simulation, and/or bioinformatics research), data analysis service 108B (e.g., to perform querying on data, discovering and extracting data from various sources; enriching, cleaning, normalizing, and combining data; and/or loading and organizing data in databases, data warehouses, and data lakes), and/or content delivery service 108C (e.g., to securely deliver data, videos, applications, and/or application programming interfaces (APIs)).

It should be understood that a customer (e.g., via device 130) may enter private information blinding mode by an API or other interface, e.g., a graphical user interface.

Figure 7:
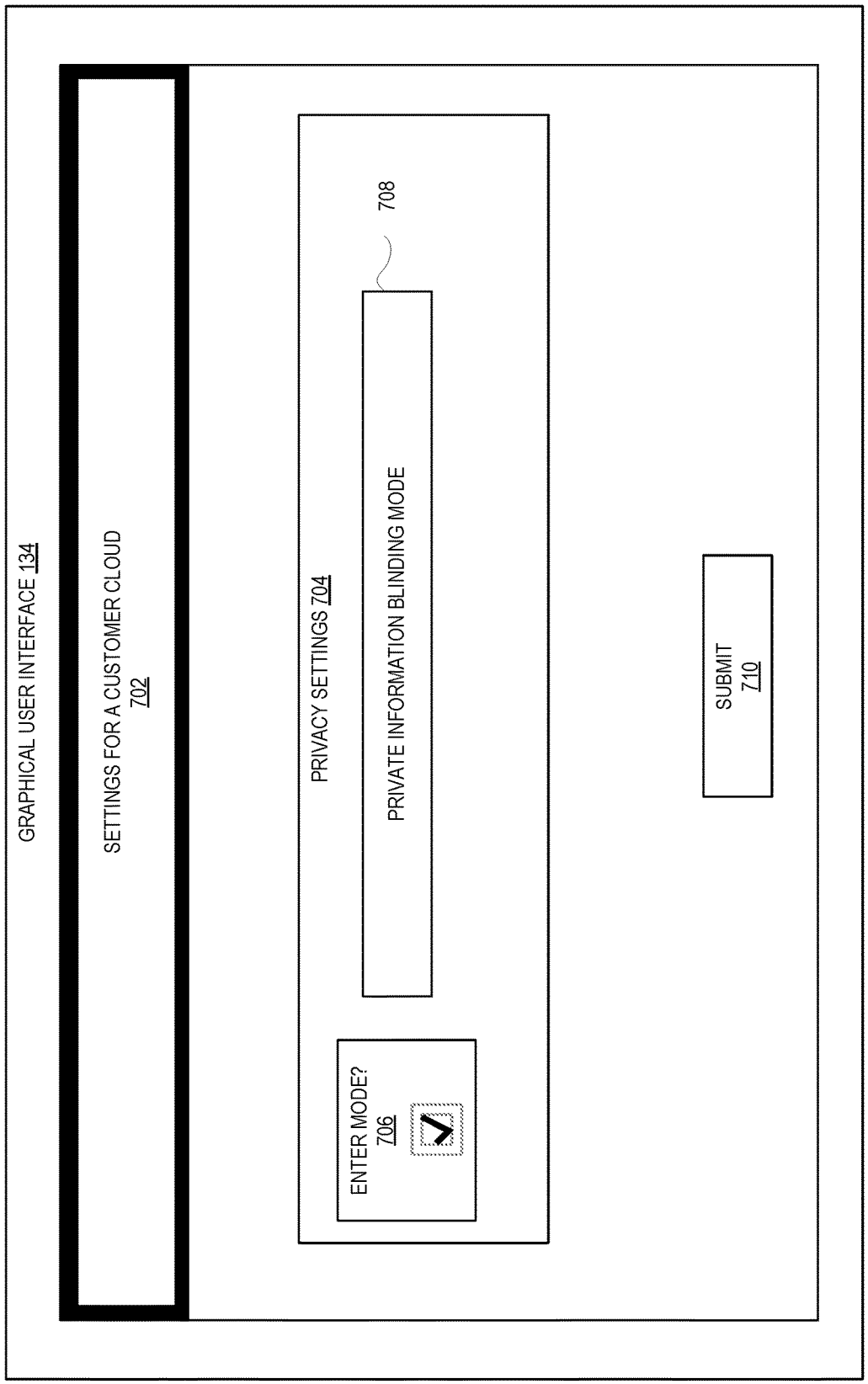
FIG. 7 is a diagram illustrating a graphical user interface for setting a privacy protecting transaction engine of a cloud provider network into a private information blinding mode according to some embodiments.

FIG. 7 is a diagram illustrating a graphical user interface 134 for setting a privacy protecting transaction engine of a cloud provider network into a private information blinding mode according to some embodiments. Depicted graphical user interface 134 includes a field 702 that is customizable with text to indicate that these are settings for a customer cloud, a field 704 that is customizable with text to indicate that these are privacy settings, an interface element 706 that, when selected, will cause a privacy protecting transaction engine of a cloud provider network to enter into a private information blinding mode, and a field 708 that is customizable with text to indicate that selecting the interface element 706 is to private information blinding. A user (e.g., cloud customer) may click the submit interface element 710 to (e.g., cause a command to be sent that causes) enter privacy protecting transaction engine of a cloud provider network to enter into a private information blinding mode (e.g., mode 110A in FIGS. 1-4). An interface element, may include, but is not limited to, a thumbs up (or down), checkbox, button, dropdown menu, etc.

Figure 8:
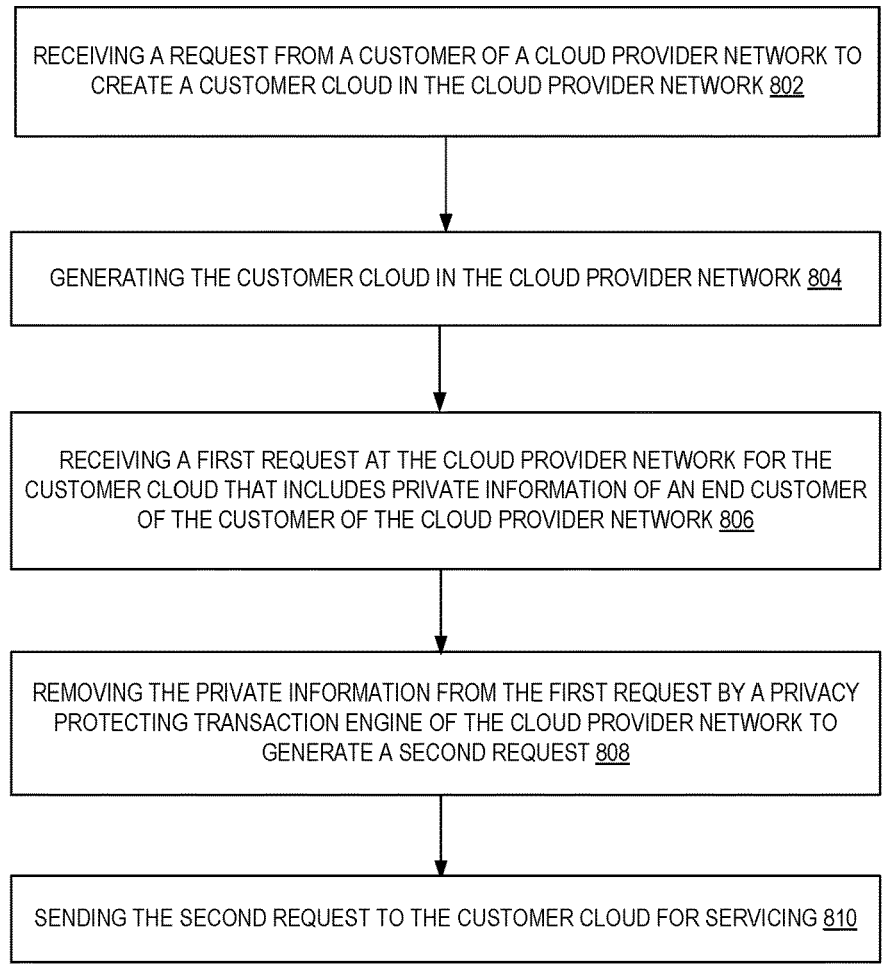
FIG. 8 is a flow diagram illustrating operations of a method for generating a customer cloud in a cloud provider network for a request from a customer of the cloud provider network and removing private information by a privacy protecting transaction engine of the cloud provider network according to some embodiments.

FIG. 8 is a flow diagram illustrating operations 800 of a method for generating a customer cloud in a cloud provider network for a request from a customer of the cloud provider network and removing private information by a privacy protecting transaction engine of the cloud provider network according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium is non-transitory. In some embodiments, one or more (or all) of the operations 800 are performed by content provider network (e.g., system/service) (or a component thereof) of the other figures.

The operations 800 include, at block 802, receiving a request from a customer of a cloud provider network to create a customer cloud in the cloud provider network. The operations 800 further include, at block 804, generating the customer cloud in the cloud provider network. The operations 800 further include, at block 806, receiving a first request at the cloud provider network for the customer cloud that includes private information of an end customer of the customer of the cloud provider network. The operations 800 further include, at block 808, removing the private information from the first request by a privacy protecting transaction engine of the cloud provider network to generate a second request. The operations 800 further include, at block 810, sending the second request to the customer cloud for servicing.

Figure 9:
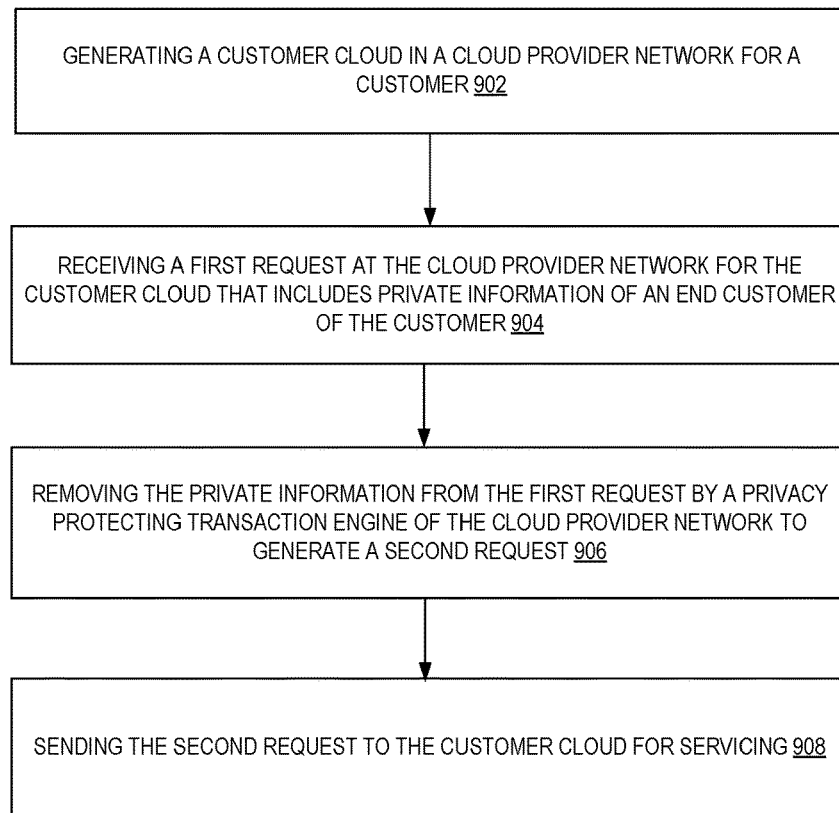
FIG. 9 is a flow diagram illustrating operations of a method for generating a customer cloud in a cloud provider network and removing private information by a privacy protecting transaction engine of the cloud provider network according to some embodiments.

FIG. 9 is a flow diagram illustrating operations 900 of a method for generating a customer cloud in a cloud provider network and removing private information by a privacy protecting transaction engine of the cloud provider network according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium is non-transitory. In some embodiments, one or more (or all) of the operations 900 are performed by content provider network (e.g., system/service) (or a component thereof) of the other figures.

The operations 900 include, at block 902, generating a customer cloud in a cloud provider network for a customer. The operations 900 further include, at block 904, receiving a first request at the cloud provider network for the customer cloud that includes private information of an end customer of the customer. The operations 900 further include, at block 906, removing the private information from the first request by a privacy protecting transaction engine of the cloud provider network to generate a second request. The operations 900 further include, at block 908, sending the second request to the customer cloud for servicing.

Exemplary environments, systems, etc. that the above may be used in are detailed below.

Figure 10:
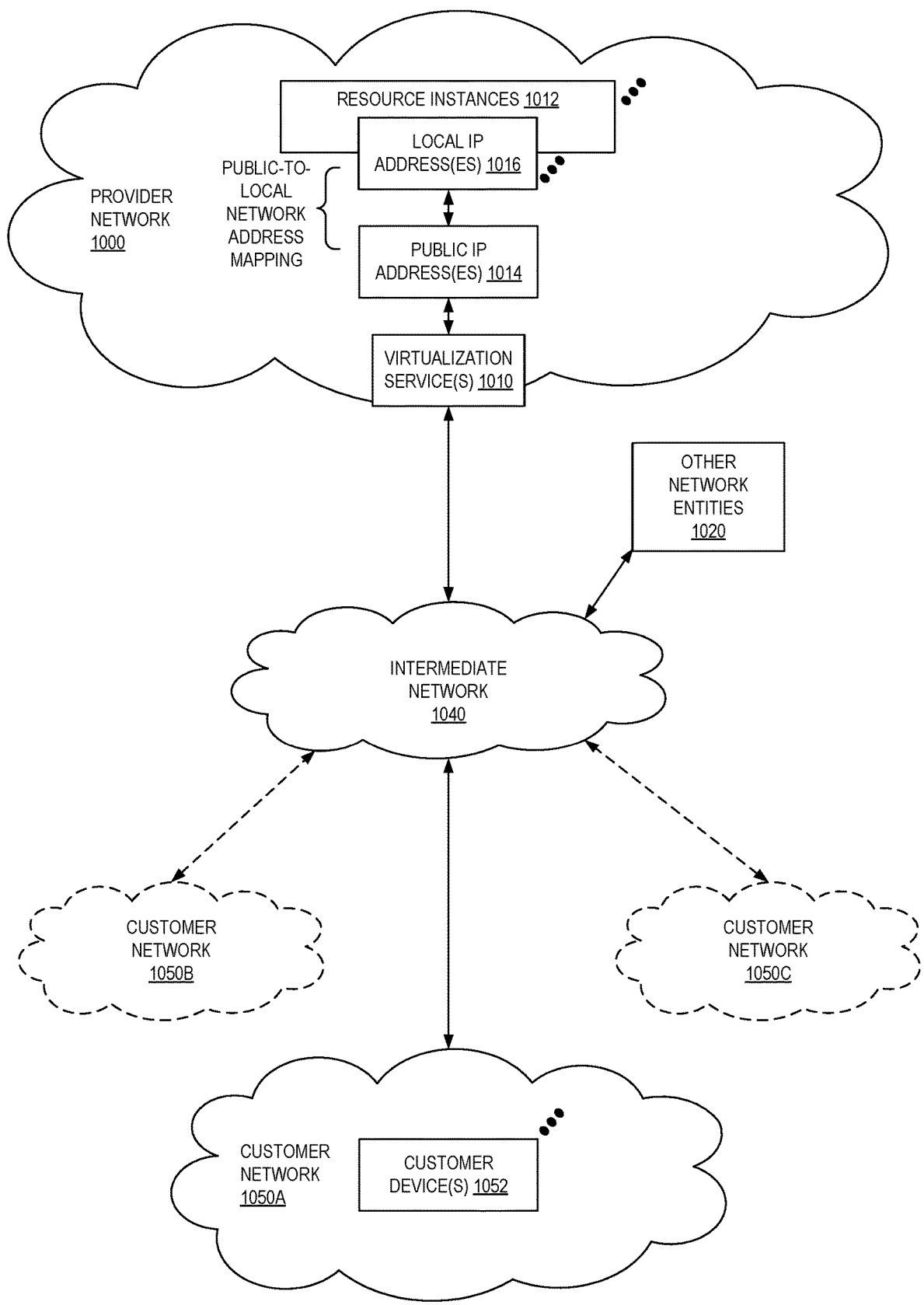
FIG. 10 illustrates an example provider network environment according to some embodiments.

FIG. 10 illustrates an example provider network (or "service provider system") environment according to some embodiments. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
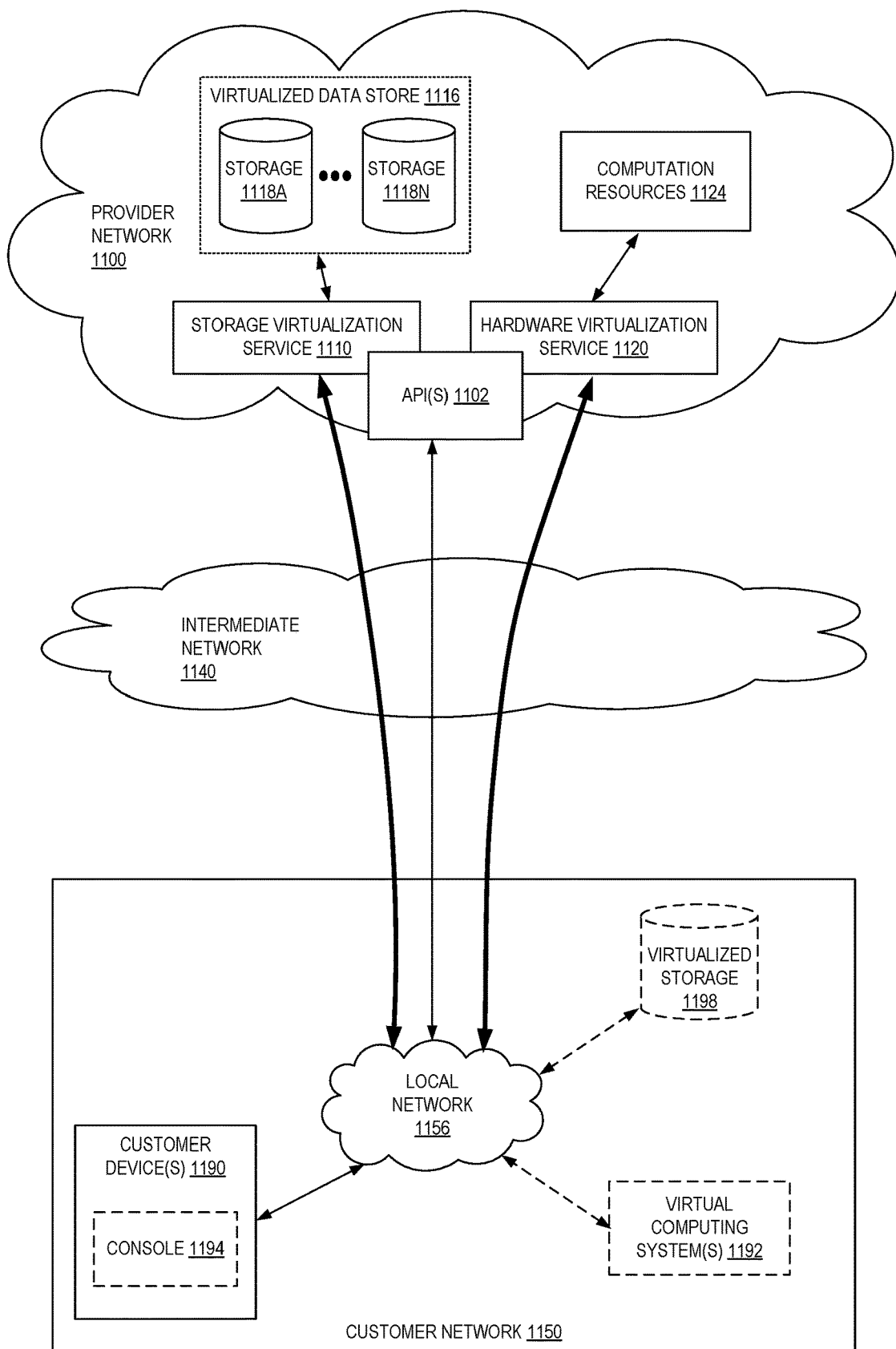
FIG. 11 is a block diagram of an example provider network that provides a storage service and a hardware virtualization service to customers according to some embodiments.

FIG. 11 is a block diagram of an example provider network that provides a storage service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some embodiments, a virtualized data store gateway (not shown) may be provided at the customer network 1150 that may locally cache at least some data, for example frequently accessed or critical data, and that may communicate with storage service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
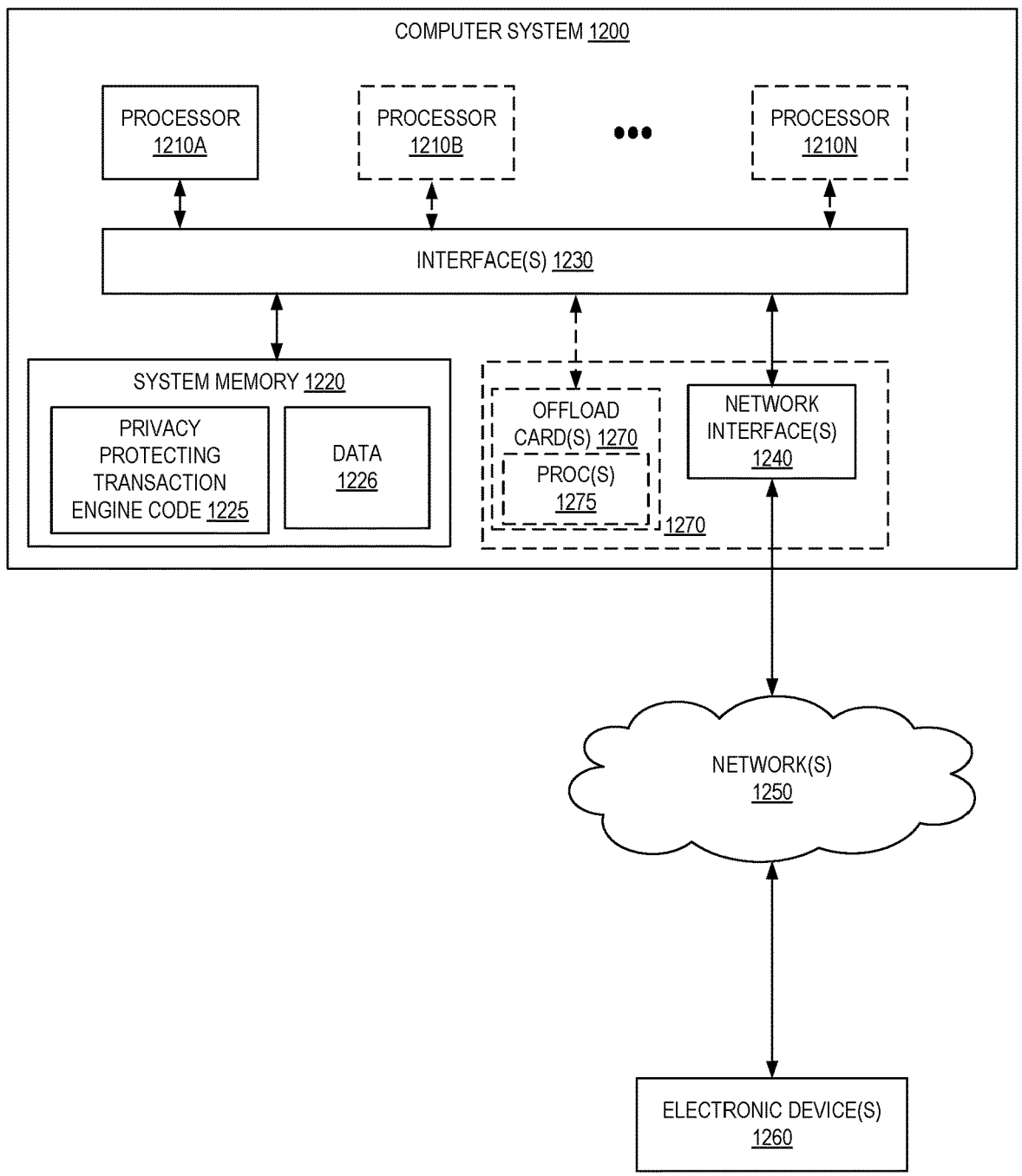
FIG. 12 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as privacy protecting transaction engine code 1225 (e.g., executable to implement, in whole or in part, the privacy protecting transaction engine 110) and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing, or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Figure 13:
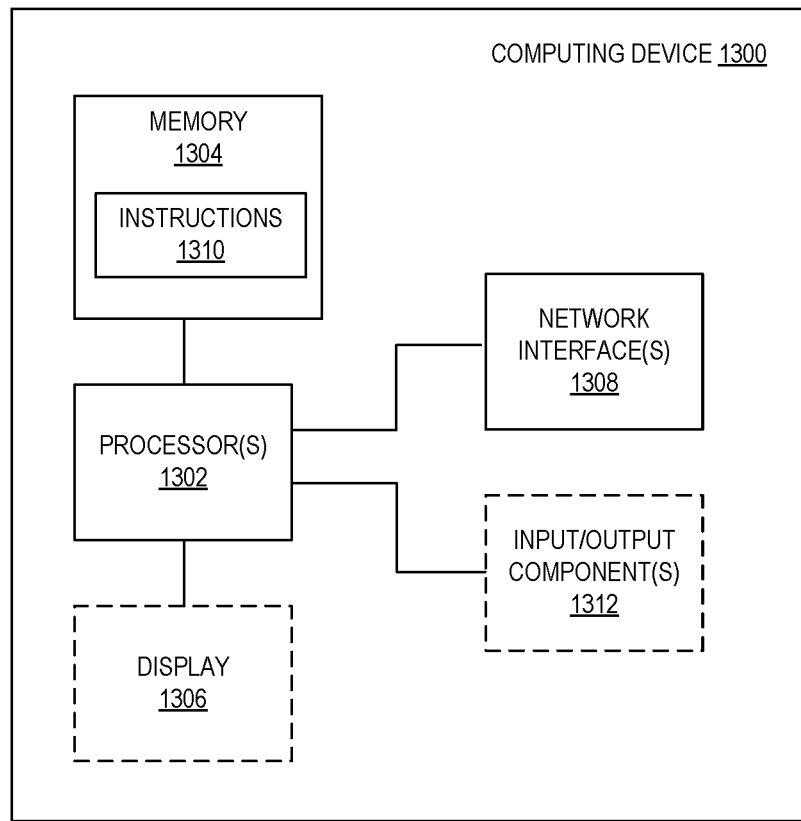
FIG. 13 illustrates a logical arrangement of a set of general components of an exemplary computing device that can be utilized in accordance with various embodiments.

FIG. 13 illustrates a logical arrangement of a set of general components of an example computing device 1300. Generally, a computing device 1300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1304) to store code (for example, instructions 1310, e.g., which implement a content delivery service as disclosed herein), and a set of one or more wired or wireless network interfaces 1308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1304) of a given electronic device typically stores code (e.g., instructions 1310) for execution on the set of one or more processors 1302 of that electronic device. One or more parts of various embodiments may be implemented using different combinations of software, firmware, and/or hardware.

A computing device 1300 can include some type of display element 1306, such as a touch screen or liquid crystal display (LCD), although many devices such as portable media players might convey information via other means, such as through audio speakers, and other types of devices such as server end stations may not have a display element 1306 at all. As discussed, some computing devices used in some embodiments include at least one input and/or output component(s) 1312 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 14:
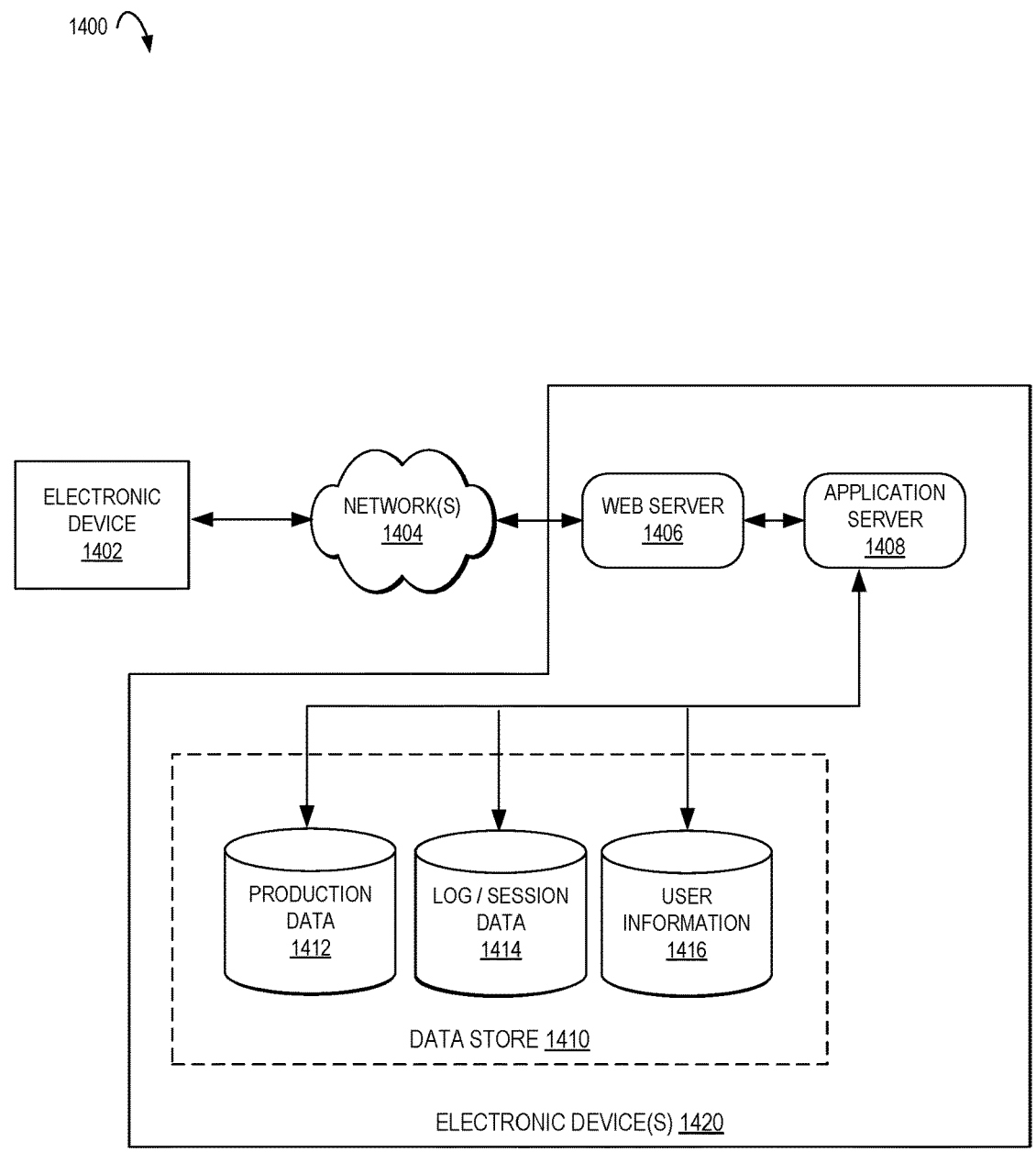
FIG. 14 illustrates an example of an environment for implementing aspects in accordance with various embodiments.

As discussed, different approaches can be implemented in various environments in accordance with the described embodiments. For example, FIG. 14 illustrates an example of an environment 1400 for implementing aspects in accordance with various embodiments. For example, in some embodiments messages are HyperText Transfer Protocol (HTTP) requests that are received by a web server (e.g., web server 1406), and the users, via electronic devices, may interact with the provider network via a web portal provided via the web server 1406 and application server 1408. As will be appreciated, although a web-based environment is used for purposes of explanation, different environments may be used, as appropriate, to implement various embodiments. The system includes an electronic client device 1402, which may also be referred to as a client device and can be any appropriate device operable to send and receive requests, messages, or information over an appropriate network 1404 and convey information back to a user of the device 1402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1404 includes the Internet, as the environment includes a web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed, or clustered environment. The application server 1408 can include any appropriate hardware and software for integrating with the data store 1410 as needed to execute aspects of one or more applications for the client device 1402 and handling a majority of the data access and business logic for an application. The application server 1408 provides access control services in cooperation with the data store 1410 and is able to generate content such as text, graphics, audio, video, etc., to be transferred to the client device 1402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1402 and the application server 1408, can be handled by the web server 1406. It should be understood that the web server 1406 and application server 1408 are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store 1410 also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. In one example, a user might submit a search request for a certain type of item. In this case, the data store 1410 might access the user information 1416 to verify the identity of the user and can access a production data 1412 to obtain information about items of that type. The information can then be returned to the user, such as in a listing of results on a web page that the user is able to view via a browser on the user device 1402. Information for a particular item of interest can be viewed in a dedicated page or window of the browser.

The web server 1406, application server 1408, and/or data store 1410 may be implemented by one or more electronic devices 1420, which can also be referred to as electronic server devices or server end stations, and may or may not be located in different geographic locations. Each of the one or more electronic devices 1420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1118A-1118N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request from a customer of a cloud provider network to create a customer cloud in the cloud provider network;
   generating the customer cloud in the cloud provider network;
   receiving a first request at the cloud provider network for the customer cloud that includes private information of an end customer of the customer of the cloud provider network;
   removing the private information from the first request by a privacy protecting transaction engine of the cloud provider network to generate a second request; and
   sending the second request to the customer cloud for servicing without utilizing the private information.

2. The computer-implemented method of claim 1, wherein the removing the private information comprises generating a secret identification key based on the private information, and the second request includes the secret identification key.

3. The computer-implemented method of claim 2, wherein the servicing comprises: generating a response based on the second request including the secret identification key; and transmitting the response to the end customer.

4. A computer-implemented method comprising:
   generating a customer cloud in a cloud provider network for a customer;
   receiving a first request at the cloud provider network for the customer cloud that includes first private information of an end customer of the customer;
   removing the first private information from the first request by a privacy protecting transaction engine of the cloud provider network to generate a second request; and
   sending the second request to the customer cloud for servicing without utilizing the first private information.

5. The computer-implemented method of claim 4, wherein the removing the first private information comprises generating a secret identification key based on the first private information, and the second request includes the secret identification key.

6. The computer-implemented method of claim 5, wherein the servicing comprises: generating a response based on the second request including the secret identification key; and transmitting the response to the end customer.

7. The computer-implemented method of claim 6, further comprising tracking a number of times a media file has been displayed by a device of the end customer by the privacy protecting transaction engine having exclusive access to the first private information within the cloud provider network, wherein the response prevents the device of the end customer from displaying the media file to the end customer when the number of times exceeds a threshold number of times.

8. The computer-implemented method of claim 5, further comprising storing a mapping of the first private information to the secret identification key in a privacy safe cloud of the cloud provider network on behalf of the customer, wherein the privacy safe cloud is inaccessible by the customer and the end customer.

9. The computer-implemented method of claim 8, further comprising invalidating the mapping when a timeout timer has been exceeded.

10. The computer-implemented method of claim 5, further comprising deleting second private information of the end customer from the first request by the privacy protecting transaction engine of the cloud provider network to generate the second request without generating a secret identification key based on the second private information.

11. The computer-implemented method of claim 10, further comprising maintaining a record of the deleted second private information within the cloud provider network, wherein the record is inaccessible by the customer and the end customer.

12. The computer-implemented method of claim 4, wherein the first private information in the first request comprises an Internet Protocol address and a user agent header of the end customer.

13. The computer-implemented method of claim 12, further comprising:
sending the Internet Protocol address and the user agent header of the end customer to a fraud detection service of the cloud provider network; and
canceling the servicing of the second request by the customer cloud in response to a detection of fraud by the fraud detection service.

14. The computer-implemented method of claim 4, further comprising:
displaying, via a graphical user interface to the customer of the cloud provider network, a query to enter a private information blinding mode;
receiving an indication from the customer via the graphical user interface to enter the private information blinding mode; and
the removing the first private information from the first request by the privacy protecting transaction engine of the cloud provider network to generate the second request is in response to the indication.

15. A system comprising:
a customer cloud implemented for a customer in a cloud provider network by a first set of one or more electronic devices; and
a privacy protecting transaction engine service implemented by a second set of one or more electronic devices, the privacy protecting transaction engine service including instructions that upon execution cause the second set of one or more electronic devices to perform operations comprising:
receiving a first request at the cloud provider network for the customer cloud that includes first private information of an end customer of the customer,
removing the first private information from the first request by a privacy protecting transaction engine of the cloud provider network to generate a second request, and
sending the second request to the customer cloud for servicing without utilizing the first private information.

16. The system of claim 15, wherein the instructions upon execution cause the privacy protecting transaction engine service to perform operations wherein the removing the first private information comprises generating a secret identification key based on the first private information, and the second request includes the secret identification key.

17. The system of claim 16, wherein the instructions upon execution cause the privacy protecting transaction engine service to perform operations wherein the servicing comprises: generating a response based on the second request including the secret identification key; and transmitting the response to the end customer.

18. The system of claim 16, wherein the instructions upon execution cause the privacy protecting transaction engine service to perform operations further comprising storing a mapping of the first private information to the secret identification key in a privacy safe cloud of the cloud provider network on behalf of the customer, wherein the privacy safe cloud is inaccessible by the customer and the end customer.

19. The system of claim 16, wherein the instructions upon execution cause the privacy protecting transaction engine service to perform operations further comprising deleting second private information of the end customer from the first request by the privacy protecting transaction engine of the cloud provider network to generate the second request without generating a secret identification key based on the second private information.

20. The system of claim 15, wherein the instructions upon execution cause the privacy protecting transaction engine service to perform operations wherein the first private information in the first request comprises an Internet Protocol address and a user agent header of the end customer.

* * * * *